US012724726B2

(12) United States Patent
Yu

(10) Patent No.: US 12,724,726 B2
(45) Date of Patent: Sep. 1, 2026

(54) MEMORY SYSTEM INCLUDING DATA STRUCTURE AND PROTOCOL FOR TRANSFERRING DEBUGGING INFORMATION

(71) Applicant: SK hynix Inc., Gyeonggi-do (KR)

(72) Inventor: Hui Jae Yu, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 4 days.

(21) Appl. No.: 18/820,267

(22) Filed: Aug. 30, 2024

(65) Prior Publication Data

US 2025/0315389 A1 Oct. 9, 2025

(30) Foreign Application Priority Data

Apr. 5, 2024 (KR) ........................ 10-2024-0046598

(51) Int. Cl.
*G06F 13/16* (2006.01)

(52) U.S. Cl.
CPC ...... *G06F 13/1668* (2013.01); *G06F 13/1642* (2013.01)

(58) Field of Classification Search
CPC ............. G06F 13/1668; G06F 13/1642; G06F 3/0679; G06F 3/0604; G06F 3/0659
See application file for complete search history.

(56) References Cited

U.S. PATENT DOCUMENTS 10,089,212 B2 10/2018 Iwai
11,532,372 B2 12/2022 Konan et al.
2016/0378582 A1* 12/2016 Choi .................. G06F 11/0727 714/37
2019/0286370 A1* 9/2019 Lee ......................... G06F 3/061
2022/0113353 A1* 4/2022 Nelson ............... G01R 31/2839
2022/0147392 A1 5/2022 Choi et al.
2023/0043925 A1* 2/2023 Jeong ................. G06F 11/3476
2024/0045762 A1* 2/2024 Gohain ................ G06F 3/0659
2024/0061611 A1* 2/2024 Liu ...................... G06F 11/073

FOREIGN PATENT DOCUMENTS

KR 10-2268699 B1 6/2021

OTHER PUBLICATIONS

Jedec, "Universal Flash Storage (UFS)," version JESD220C, Mar. 2016.*
Khaled Khalifa et al., Memory Controller Architectures: A comparative Study, 2013 8th IEEE Design and Test Symposium, Dec. 16-18, 2013, IEEE, Marrakesh.
Extended European Search Report for European Patent Application No. 24221825.3 issued by the European Patent Office on May 14, 2025.

* cited by examiner

*Primary Examiner* — Tracy A Warren
(74) *Attorney, Agent, or Firm* — IP & T GROUP LLP

(57) ABSTRACT

A memory system includes at least one memory device; and a controller coupled to the at least one memory device. The controller has a layered structure including plural service layers and including at least one component configured to provide communication between the plural service layers. An uppermost layer among the plural service layers parses whether a command input from an external device is related to data input and output or debugging information, and send, based on a parsing result, the command to a next layer among the plural service layers via one of multiple access points corresponding to multiple queues.

20 Claims, 7 Drawing Sheets

150
MEMORY SYSTEM
160
CONTROLLER
180
MEMORY DEVICE
CHs
168
Memory Controller
166
164
Controller IP Core
162
M-PHY
RST
REF-CLK
DIN
DOUT
110
HOST
122
M-PHY
120
Controller IP Core
118
HCI (AMBA Interface)
116
112
HOST CPU
114
HOST MEMORY

FIG. 3

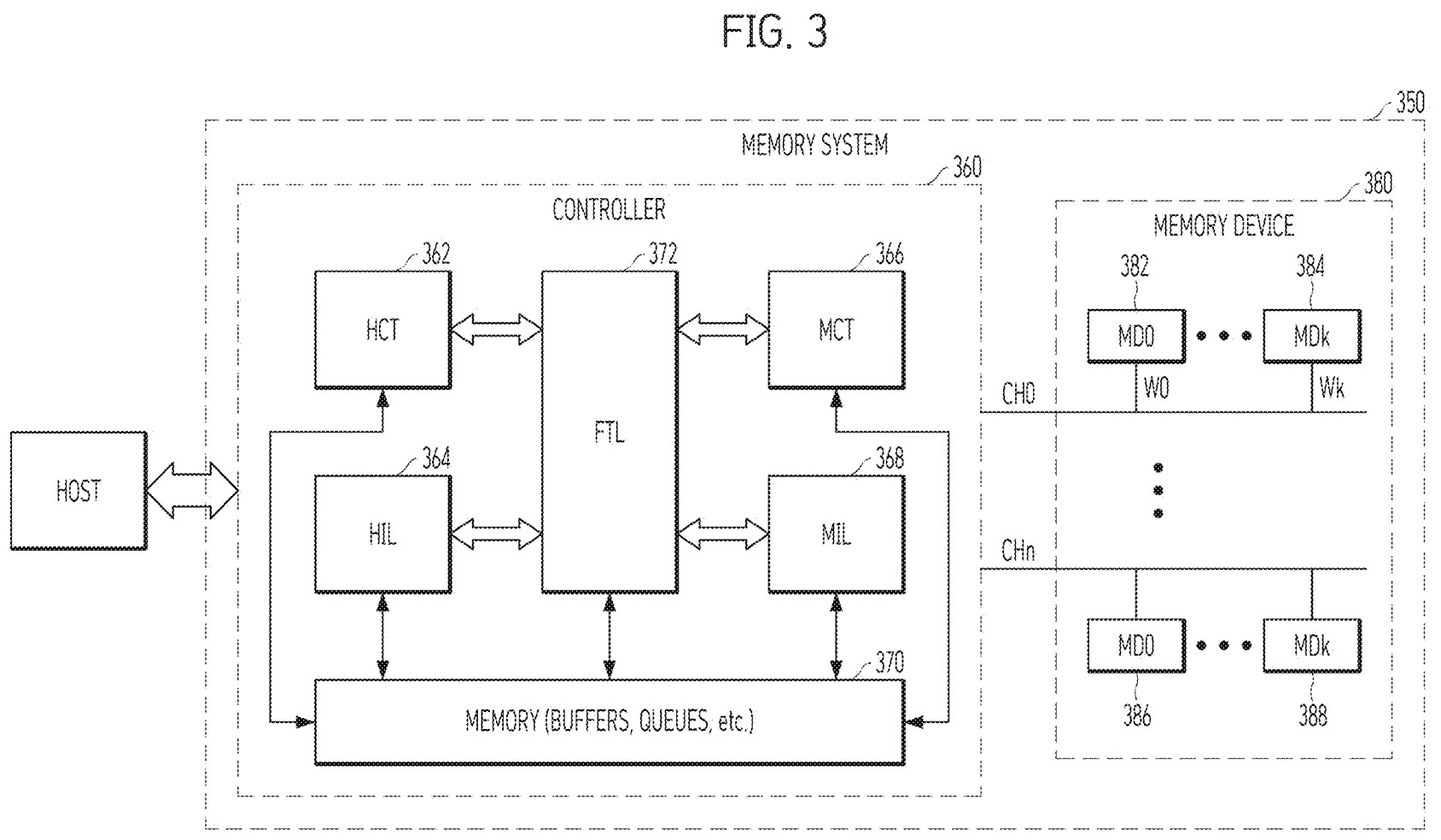

HOST
350
MEMORY SYSTEM
360
CONTROLLER
362
HCT
364
HIL
372
FTL
366
MCT
368
MIL
370
MEMORY (BUFFERS, QUEUES, etc.)
CH0
CHn
380
MEMORY DEVICE
382
MD0
W0
384
MDk
Wk
386
MD0
388
MDk

FIG. 5

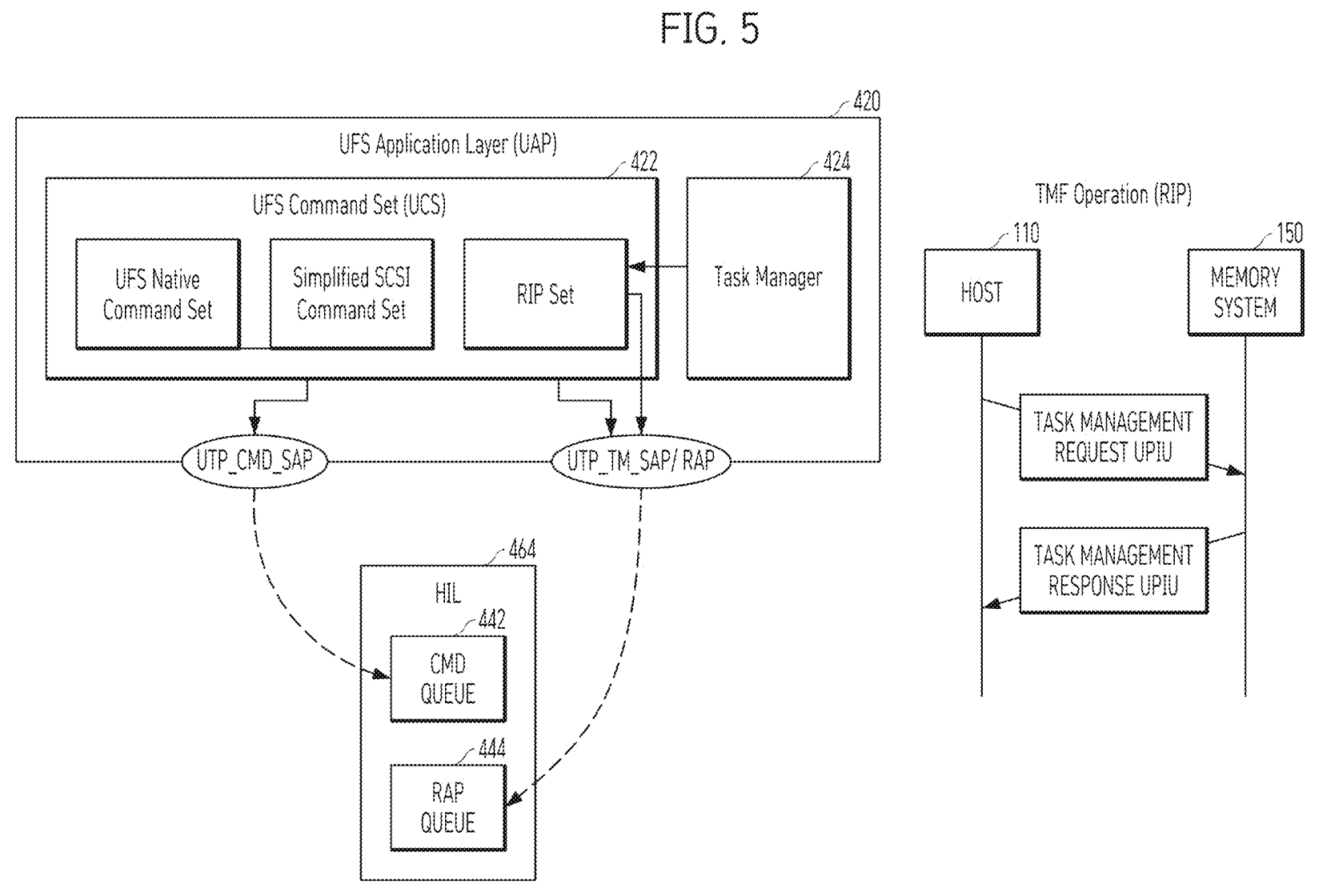

420
UFS Application Layer (UAP)
422
UFS Command Set (UCS)
UFS Native Command Set
Simplified SCSI Command Set
RIP Set
424
Task Manager
UTP_CMD_SAP
UTP_TM_SAP/ RAP
464
HIL
442
CMD QUEUE
444
RAP QUEUE TMF Operation (RIP)
110
HOST
150
MEMORY SYSTEM
TASK MANAGEMENT REQUEST UPIU
TASK MANAGEMENT RESPONSE UPIU

FIG. 6
(PRIOR ART)

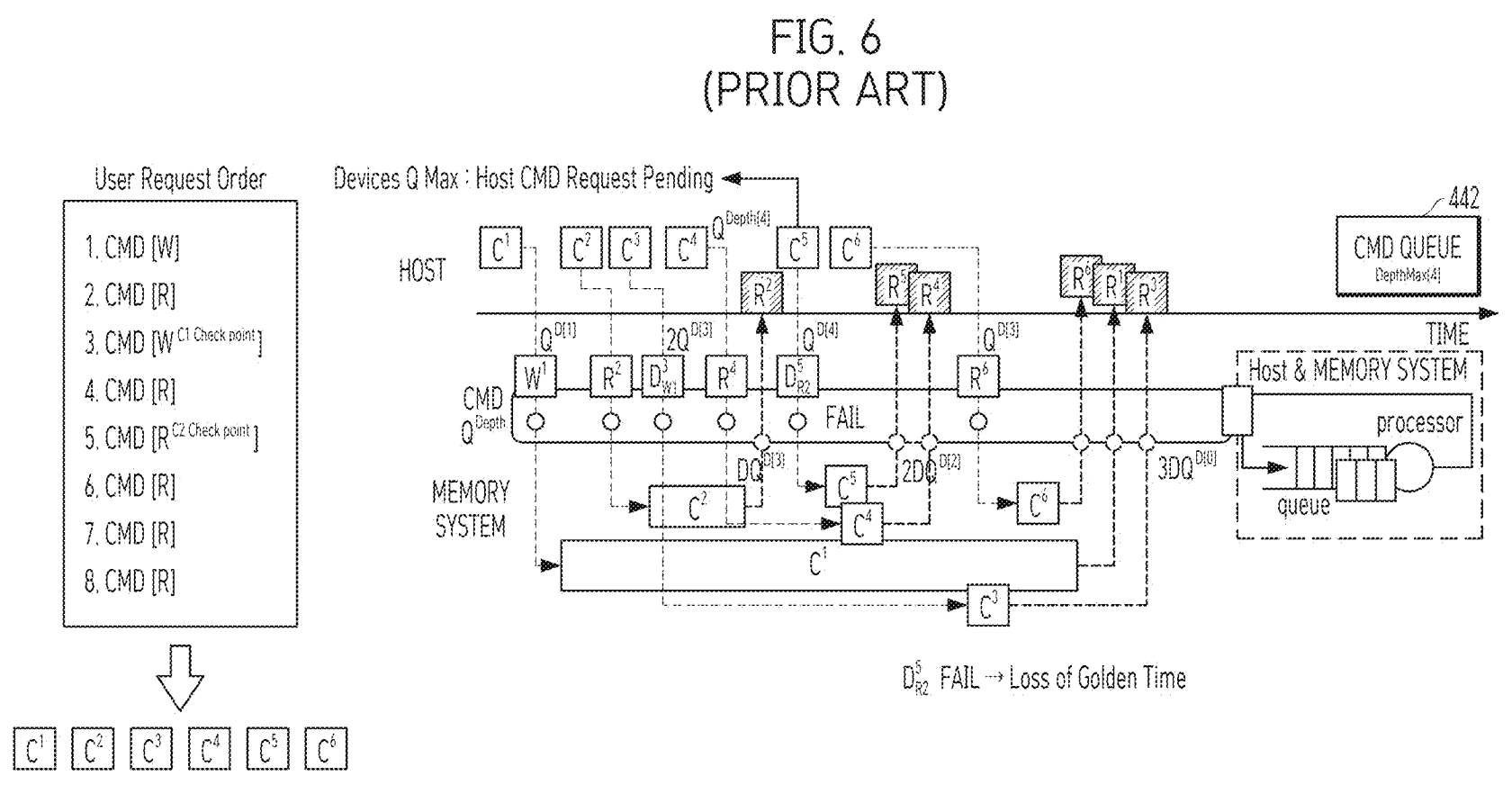

User Request Order

1. CMD [W]
2. CMD [R]
3. CMD [W^C1 Check point]
4. CMD [R]
5. CMD [R^C2 Check point]
6. CMD [R]
7. CMD [R]
8. CMD [R]

Devices Q Max : Host CMD Request Pending

HOST

CMD Q^Depth

MEMORY SYSTEM

FAIL $D^5_{R2}$ FAIL → Loss of Golden Time

TIME

Host & MEMORY SYSTEM processor queue

CMD QUEUE [DepthMax[4]]

Figure 7:
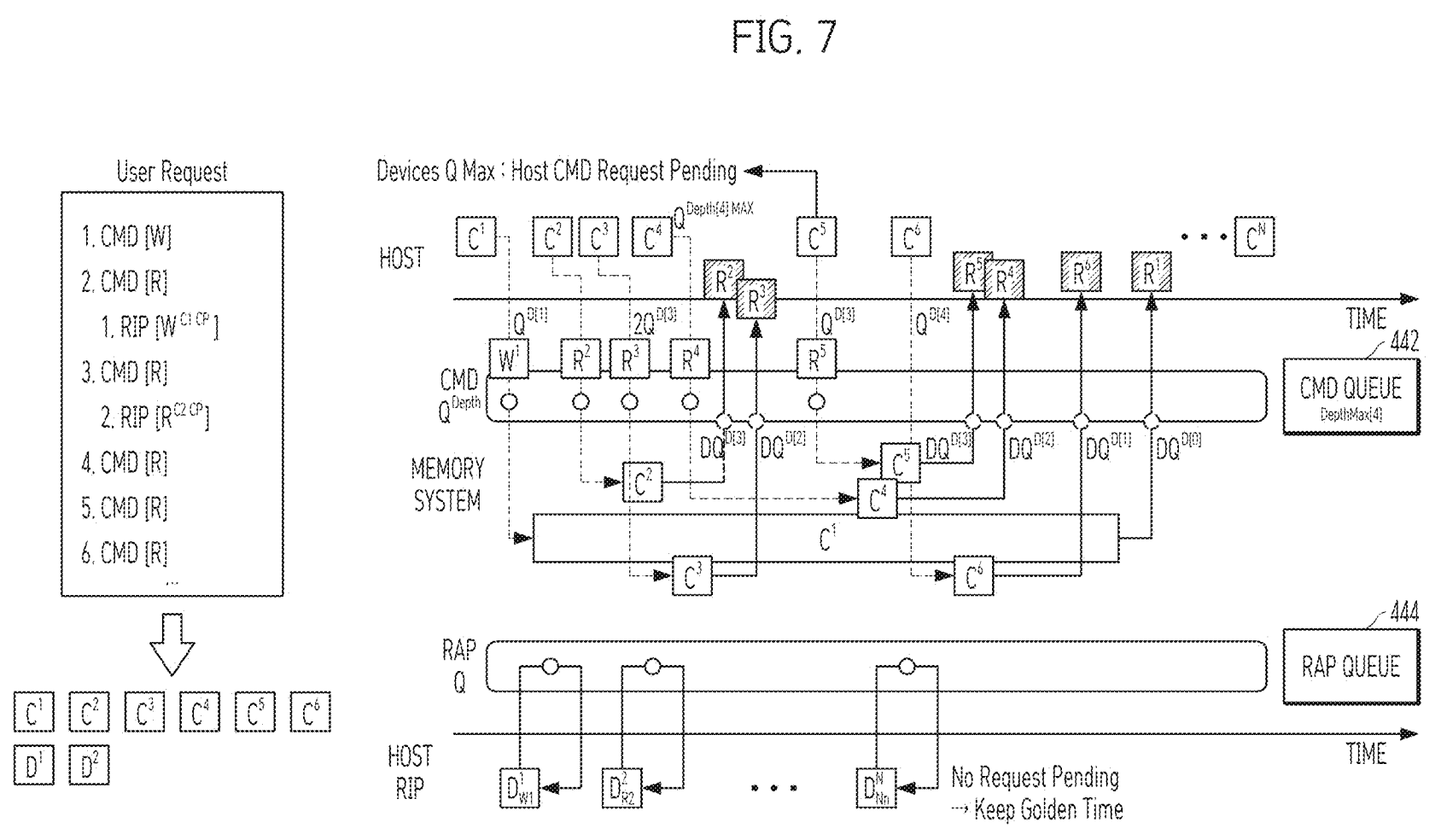

User Request

1. CMD [W]
2. CMD [R]
   1. RIP [W^C1 CP]
3. CMD [R]
   2. RIP [R^C2 CP]
4. CMD [R]
5. CMD [R]
6. CMD [R]
...

Devices Q Max : Host CMD Request Pending

HOST

TIME

CMD QUEUE DepthMax[4]

442

MEMORY SYSTEM

RAP Q

RAP QUEUE

444

HOST RIP

No Request Pending → Keep Golden Time

MEMORY SYSTEM INCLUDING DATA STRUCTURE AND PROTOCOL FOR TRANSFERRING DEBUGGING INFORMATION

CROSS-REFERENCE TO RELATED APPLICATIONS

This patent application claims the benefit of priority under 35 U.S.C. § 119 to Korean Patent Application No. 10-2024-0046598 filed on Apr. 5, 2024, the entire disclosure of which is incorporated herein by reference.

TECHNICAL FIELD

One or more embodiments of the present disclosure relate to a memory device, a memory system including the memory device, and an operation method thereof, and more particularly, to an apparatus and an operation method for providing a protocol and a data structure to transfer debugging information different from data input/output.

BACKGROUND

A memory system includes a volatile memory or a non-volatile memory. The memory system may include several components to efficiently operate the volatile memory or the non-volatile memory. Memory systems may undergo various tests to determine whether they operate normally after manufactured. Additionally, the memory system can perform a debugging operation while data input/output operations are performed therein. Depending on an event that occurs inside the memory system, data or information corresponding to the event may be transmitted to an external device.

BRIEF DESCRIPTION OF THE DRAWINGS

The description herein makes reference to the accompanying drawings wherein like reference numerals refer to like parts throughout the figures.

FIG. 3 illustrates a memory system according to an embodiment of the present disclosure.

FIG. 5 illustrates a service layer and a data structure for transferring debugging information according to an embodiment of the present disclosure.

FIG. 6 illustrates an operation of a conventional memory system.

FIG. 7 illustrates an operation of the memory system device according to an embodiment of the present disclosure.

DETAILED DESCRIPTION

Figure 1:
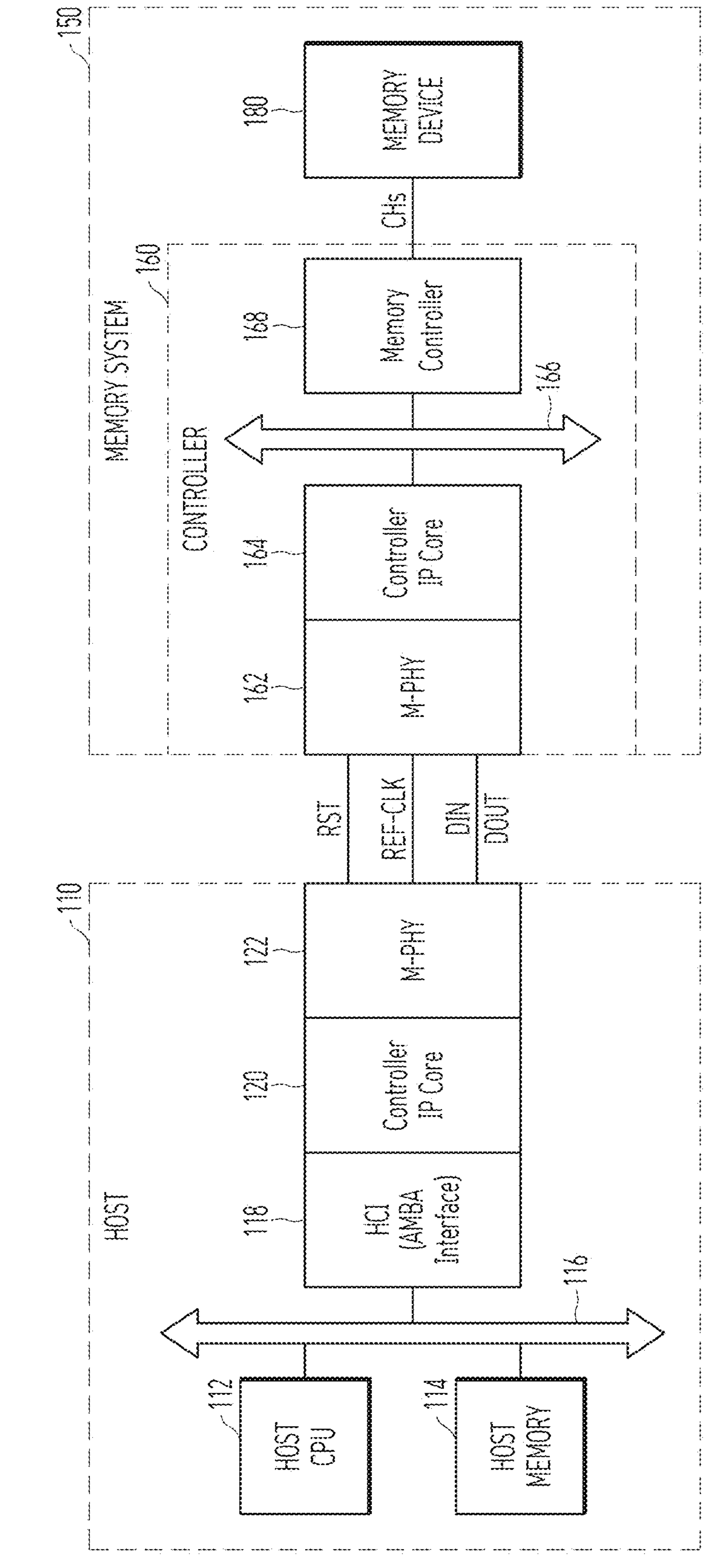
FIG. 1 illustrates a first data processing apparatus according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. Examples of block/unit/circuit/component used with the "configured to" language include hardware, circuits, memory storing program instructions executable to implement the operation, etc. Additionally, "configured to" can include a generic structure, e.g., generic circuitry, that is manipulated by software and/or firmware, e.g., an FPGA or a general-purpose processor executing software to operate in a manner that is capable of performing the task(s) at issue. "Configured to" may also include adapting a manufacturing process, e.g., a semiconductor fabrication facility, to fabricate devices, e.g., united circuits that are adapted to implement or perform one or more tasks.

As used in this disclosure, the term 'machine,' 'circuitry' or 'logic' refers to all of the following: (a) hardware-only circuit implementations such as implementations in only analog and/or digital circuitry and (b) combinations of circuits and software and/or firmware, such as (as applicable): (i) to a combination of processor(s) or (ii) to portions of processor(s)/software including digital signal processor(s), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'machine,' 'circuitry' or 'logic' applies to all uses of this term in this application, including in any claims. As a further example, as used in this application, the term 'machine,' 'circuitry' or 'logic' also covers an implementation of merely a processor or multiple processors or portion of a processor and its (or their) accompanying software and/or firmware. The term 'machine,' 'circuitry' or 'logic' also covers, for example, and if applicable to a particular claim element, an united circuit for a storage device.

As used herein, the terms 'first,' 'second,' 'third,' and so on are used as labels for nouns that they precede, and do not imply any type of ordering, e.g., spatial, temporal, logical, etc. The terms 'first' and 'second' do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term 'based on' is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, a data entry, an entry of data, an item of data, or a data item may be a sequence of bits. For example, the data entry may include the contents of a file, a portion of the file, a page in memory, an object in an object-oriented program, a digital message, a digital scanned image, a part of a video or audio signal, metadata or any other entity which can be represented by a sequence of bits. According to an embodiment, the data entry may include a discrete object. According to another embodiment, the data entry may include a unit of information processed or handled for a data input/output operation. According to yet another embodiment, the data entry may include a unit of information within a transmission packet between two different components.

An embodiment of the present disclosure can provide a memory system including a memory device, a data processing system including the memory system, and an operation process or a method, which may quickly and reliably process data into a memory device by reducing operational complexity and performance degradation of the memory system, thereby enhancing usage efficiency of the memory device.

An apparatus and a method according to an embodiment of the present disclosure can improve performance of a memory device and a memory system including the memory device.

An apparatus and a method according to an embodiment of the present disclosure can transfer debugging information regarding various components such as a memory device and a controller included in the memory system to an external device. To avoid degradation of, or delays in, data input/output operations performed by the memory system due to the transfer of debugging information, the memory system may include a protocol and a data structure for the transfer of debugging information that is different, distinct, or distinguishable from data input/output.

An embodiment of the present disclosure can provide a memory system including at least one memory device; and a controller coupled to the at least one memory device, the controller having a layered structure including plural service layers and including at least one component configured to provide communication between the plural service layers. The plural service layers include an uppermost layer and a next layer adjacent to the uppermost layer. The uppermost layer is configured to parse whether a command input from an external device is related to data input and output or debugging information, and send, based on a parsing result, the command to the next layer via one of multiple access points corresponding to multiple queues, wherein the access points are different from each other, and the multiple queues are different from each other.

The uppermost layer can include an application layer, and the next layer can include a transport protocol layer.

The transport protocol layer can be configured to exchange a query request and a query response to the query request with the application layer through one of a first access point used for performing device level management including descriptor access, a second access point used for transmitting a command related to the data input and output, and a third access point used for transmitting a command related to the debugging information. The second access point and the third access point are included in the multiple access points.

The application layer can transmit an abort task function through the third access point.

The multiple queues can includes a first queue storing a command related to the data input and output, and a second queue storing a command related to the debugging information. The uppermost layer can include a task manager configured to add the command input from the external device into one of the first queue and the second queue.

The controller can be configured to control a device level operation and comprise a device manager configured to manage a device level configuration. The device level operation can include a device power management, a data transfer related setting, and a background task activation. The device level configuration can include an operation for processing a query request which is used for modifying or retrieving configuration information through a set of descriptors.

The device manager can be configured to exchange a query request and a query response to the query requests with a transport protocol layer through a fourth access point for processing a device level operation and configuration including processing a query request regarding descriptors, and exchange a query request and a query response to the query request through a fifth access point for triggering a reset of an interconnect layer and performing a management function for the interconnect layer.

The at least one memory device can include at least one data storage area including non-volatile memory cells. The controller and the at least one memory device can be coupled through at least one channel.

The plurality of components can include a host controller interface configured to control a physical connection with the external device and determine a data transmission scheme for enabling data communication with the external device; a host interface layer configured to manage a data packet input from or output from the external device; a flash controller configured to control a physical connection with the at least one memory device and determine a data transmission scheme for enabling communication with the at least one memory device; a flash interface layer configured to manage a data packet output from or stored in the at least one memory device; and a flash translation layer configured to control processing and transfer of tasks among the host controller interface, the host interface layer, the flash controller, and the flash interface layer, and to manage mapping between a first address used by the external device and a second address used by the at least one memory device.

The command can include information for security authentication when the command relates to the debugging information. The controller can be configured to determine a validity of the information for the security authentication included in the command.

Another embodiment of the present disclosure can provide a memory controller comprising a host interface layer operably engaged with an external device, and a memory control layer operably engaged with a memory device. The host interface layer can be configured to parse whether a command input from the external device is related to data input and output or debugging information; store the command in one of data structures based on a parsing result; and handle the command through one of multiple access points corresponding to the data structures to transfer the command to the memory control layer.

The data structures can include a first queue storing a command related to the data input/output; and a second queue storing a command related to the debugging information.

The host interface layer can be configured to perform operations provided by plural service layers comprising an uppermost layer and a lower layer lower than the uppermost layer. The uppermost layer includes an application layer, and the lower layer includes a transport protocol layer.

The transport protocol layer can be configured to exchange a query request and a query response to the query request with the application layer through one among a first access point for performing device level management including descriptor access, a second access point for transmitting a command related to the data input and output, and a third access point for transmitting a command related to the debugging information. The second access point and the third access point are included in the multiple access points.

The application layer can transmit an abort task function through the third access point.

The uppermost layer can include a task manager configured to add a command input from the external device into one of a first queue and a second queue.

The memory controller can further include a device manager configured to manage a device level configuration. The device level operation can include a device power management, a data transfer related setting, and a background task activation. The device level configuration can include an operation for processing a query request which is used for modifying or retrieving configuration information through a set of descriptors.

The device manager can be configured to exchange a query request and a query response to the query requests with a transport protocol layer through a fourth access point used for processing a device level operation and configuration which includes processing a query request regarding descriptors; and exchange a query request and a query response to the query request through a fifth access point used for triggering a reset of an interconnect layer and performing a management function for the interconnect layer The memory controller can be coupled through at least one channel to at least one memory device including at least one data storage area including non-volatile memory cells.

The memory controller can further include a host controller interface configured to control a physical connection with the external device and determine a data transmission scheme for enabling data communication with the external device; a host interface layer configured to manage a data packet input from or output from the external device; a flash controller configured to control a physical connection with the at least one memory device and determine a data transmission scheme for enabling communication with the at least one memory device; a flash interface layer configured to manage a data packet output from or stored in the at least one memory device; and a flash translation layer configured to control processing and transfer of tasks among the host controller interface, the host interface layer, the flash controller, and the flash interface layer, and to manage mapping between a first address used by the external device and a second address used by the at least one memory device.

Embodiments will now be described with reference to the accompanying drawings, wherein like numbers reference like elements.

FIG. 1 illustrates a first data processing apparatus according to an embodiment of the present disclosure.

Referring to FIG. 1, the first data processing apparatus can include a host 110 and a memory system 150. The host 110 and the memory system 150 can include a Universal Flash Storage (UFS) electrical interface. The memory system 150 can have characteristics of UFS memory device. The characteristics can include low power consumption, high data throughput, low electromagnetic interference, and large memory subsystem efficiency optimization. The UFS electrical interface may be based on a differential interface suggested by a Mobile Industry Processor Interface (MIPI) M-PHY specification, which establishes and supports interconnection of the UFS interface with a MIPI Unified Protocol (UniPro) specification.

According to an embodiment, the host 110 can be an entity or a device that has the characteristics of a computing device that includes one or more Small Computer System Interface (SCSI) initiator devices. The host 110 and the memory system 150 may use a predetermined set of rules or procedures for data communication or a preset interface to transmit and receive data therebetween. Examples of sets of rules or procedures for data communication standards or interfaces supported by the host 110 and the memory system 150 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), United Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host 110 and the memory system 150 may be coupled to each other through a Universal Serial Bus (USB). The Universal Serial Bus (USB) is a highly scalable, hot-pluggable, plug-and-play serial interface that ensures cost-effective, standard connectivity to peripheral devices such as keyboards, mice, joysticks, printers, scanners, storage devices, modems, video conferencing cameras, and the like.

According to an embodiment, the memory system 150 can be implemented as any of various types of storage devices such as a solid state drive (SSD), a multi-media card (MMC), an embedded MMC (eMMC), a reduced size MMC (RS-MMC), or a micro-MMC, a Secure Digital (SD) card in a form of the micro-SD, a Universal Storage Bus (USB) storage device, a Universal Flash Storage (UFS) device, a compact flash (CF) card, a Smart Media card, a Memory Stick, and etc.

The host 110 can include a host central processing unit (CPU) 112, a host memory 114, a bus interface 116, a host controller interface (HCI) 118, at least one controller IP core 120, and a physical layer 122. The host central processing unit 112 may be capable of executing at least one application. The host memory 114 may store data to be transmitted to the host central processing unit 112 or data generated by the host central processing unit 112. The bus interface 116 may be an interface for communication between components included in the host 110. The host controller interface 118 may output or receive data to or from an external device (e.g., memory system 150) coupled to the host 110. The at least one controller IP core 120 may perform various functions such as data, command or control signal transmission, error handling, power management, and the like. The physical layer 122 may perform communication based on the MIPI M-PHY specification.

The at least one controller IP core 120 can manage and control communication between the host 110 and the memory system 150. For example, the controller IP core 120 can be used to transmit data from the host 110 to the memory system 150, and to perform operations for detecting and recovering an error occurred in data, which is transmitted from the memory system 150 to the host 110.

The physical layer 122 can perform communication according to a serial communication protocol developed by the Mobile Industry Processor Interface (MIPI) organization. The physical layer 122 can be designed for high-speed data transmission used in mobile devices and other low-power devices. The physical layer 122 can be used for communication between various devices such as mobile displays, cameras, sensors, memory, etc., depending on the embodiment. In particular, the physical layer 122 can support low-power operation so that the physical layer 122 can minimize power consumption to extend a life of a battery embedded in mobile devices. In addition, the physical layer 122 can provide a high bandwidth and a fast data transmission speed via a parallel processing scheme using a multi-lane architecture, meeting the needs of high-definition video and large file transmission.

The host controller interface 118 can provide communication with the at least one controller IP core 120 and other components coupled via the bus interface 116. For example, the AMBA (Advanced Microcontroller Bus Architecture) is a bus-based communication protocol and interface developed by ARM Ltd. AMBA interface, which includes AXI (Advanced extensible Interface), AHB (Advanced High-performance Bus), or APB (Advanced Peripheral Bus), can be used for communication between intellectual property (IP) cores in System-on-Chip (SoC) designs. Further, the bus interface 116 can also support exchange of data or control signals between various components and the at least one controller IP core 120, which are included in the host 110.

Referring to FIG. 1, the physical layer 122 in the host 110 can transmit or receive, to or from the memory system 150, a reset signal (RST), a reference clock (REF-CLK), input data or write data (DIN), and output data or read data (DOUT).

The memory system 150 can include a controller 160 and a memory device 180. Herein, the memory device 180 may include at least one data storage space including volatile memory cells or non-volatile memory cells. A detailed description of the memory device 180 will be described later with reference to FIG. 3.

The controller 160, which is coupled to the memory device 180 through at least one channel (CHs), can receive signals, commands, or data input from the host 110 and perform operations responsive to the signals, the commands, the data. For example, the controller 160 can store data in the memory device 180 when the data is input from the host 110. The controller 160 can transmit, to the host 110, data, which is requested by the host 110 and received from the memory device 150. The controller 160 may include a physical layer 162, at least one controller IP core 164, a bus interface 166, and a memory controller 168.

The controller 160 included in the memory system 150 can include the physical layer 162 that is substantially similar to the physical layer 122 included in the host 110. The physical layer 162 may receive or transmit signals or data transmitted from or to the host 110. For example, the physical layer 162 and the physical layer 122 can operate as counter parts for each other.

According to an embodiment, the at least one controller IP core 164 in the memory system 150 can be substantially the same as the at least one controller IP core 120 in the host 110. In another embodiment, the at least one controller IP core 164 can be different from the at least one controller IP core 120. The configuration of the at least one controller IP core 164 can be determined or established in response to the bus interface 166 that supports communication between various components included in the memory system 150.

The memory controller 168 may be designed or configured based on the configuration of the memory device 180. For example, when the memory device 180 is a flash memory, the memory controller 168 may support communication with a flash memory such as a NAND or NOR device. For example, the memory controller 168 can support communication schemes and protocols set in the ONFI (Open NAND Flash Interface). The ONFI can use a data path (e.g., a channel, a way, etc.) that includes signal lines that is capable of supporting bidirectional transmission and reception of 8-bit or 16-bit data unit between different components. Data communication between the controller 160 and the memory device 180 can be performed through a device that supports an interface designed for at least one scheme among asynchronous SDR (Asynchronous Single Data Rate), synchronous DDR (Synchronous Double Data Rate), and Toggle DDR (Toggle Double Data Rate).

Figure 2:
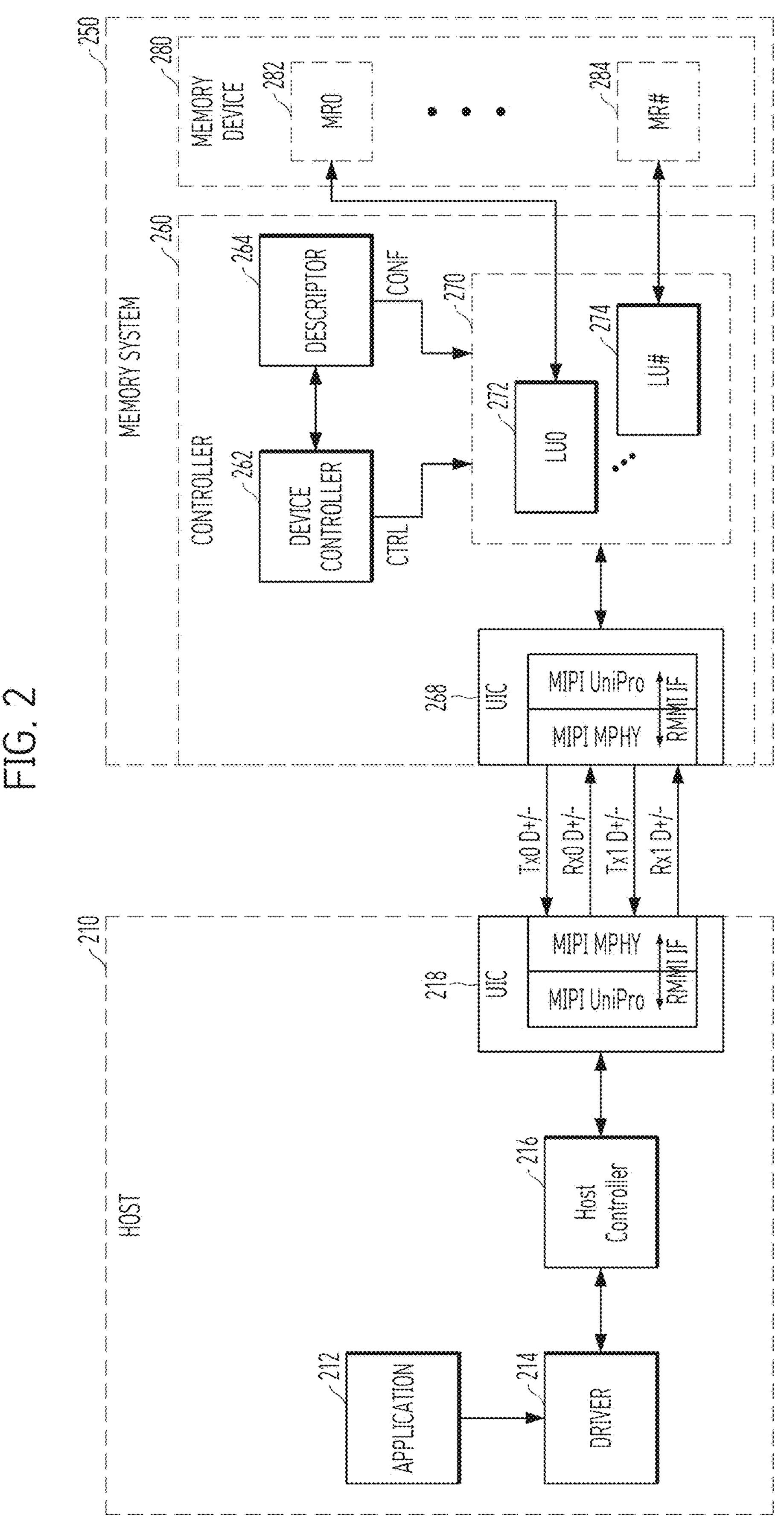
FIG. 2 illustrates a second data processing apparatus according to an embodiment of the present disclosure.

FIG. 2 illustrates a second data processing apparatus according to an embodiment of the present disclosure. While FIG. 1 illustrates the physical components included in the host 110 and the memory system 150 included in the first data processing apparatus, FIG. 2 illustrates the second data processing apparatus in terms of the flow of commands, tasks, or jobs related to operations performed by components of a host 210 and a memory system 250.

Referring to FIG. 2, an application 212 running on the host 210 can generate or transfer a command, a task, or a job to a driver 214. Here, the application 212 can be understood as a component being executed by the host central processing unit (CPU) 112 described in FIG. 1.

The driver 214, arranged between the application 212 and a host controller 216 in the host 210, can be a software component that serves as an interface between hardware and software configurations. The driver 214 can include software codes and functions necessary to control and interact with specific hardware devices. The driver 214 can transfer information or commands between hardware components (e.g., components described in FIG. 1) in the host 210, control an operation performed by the hardware components, and manage data exchange between the hardware components. The application 212 can access or manipulate hardware devices through the driver 214.

According to an embodiment, the driver 214 could be configured in a way that is compatible with a specific hardware device, so that the driver 241 can be designed based on information about the specific hardware device and an operation scheme thereof. Further, the driver 214 can be implemented primarily using an Application Programming Interface (API) provided by an operating system (OS). This allows the application 212 to interact with the driver 214 through a standardized interface. The driver 214 can transmit commands or data received from the application 212 to a hardware device such as a unified interface controller 218 and return a response or data from the hardware device to the application 212. The driver 214 could be configured or designed to perform hardware initialization, hardware configuration, operation control, data transmission, error processing, and the like.

A host controller 216 and a Unified Interface Controller (UIC) 218 within the host 110 can be used in a Universal Serial Bus (USB) based system. The host controller 216 can be considered a main component that manages and controls a bus (i.e., USB) connecting the host 210 to the memory system 250. The host controller 216 can be configured to detect connection and removal of USB devices, manage data transfers between the host 110 and the USB devices, and coordinate communications with the USB devices. The host controller 216 can mediate communication between the application 212 and the memory system 250 through a USB interface. The host controller 216 could ensure stable transmission of data by complying with the USB protocol.

The unified interface controller 218 can be used in the high-speed USB interface. The unified interface controller 218 can be a combination of software and hardware configured to manage communications between the host controller 216 and the memory system 250. The unified interface controller 218 can include a protocol stack and a driver arranged between the host controller 216 and the memory system 250. The unified interface controller 218 can manage or control connection, data transfer, power management, and the like, between the host controller 216 and the memory system 250. Additionally, the unified interface controller 218 can efficiently process data transmission between the memory system 250 and the host controller 216 and support maximum utilization of the high speed and performance of the Universal Serial Bus.

A unified protocol (MIPI UniPro) in the unified interface controller 218 can be one of the Mobile Industry Processor Interface (MIPI). The unified protocol (MIPI UniPro) can be designed to provide or support serial communication protocols used in mobile and embedded systems. The unified protocol (MIPI UniPro) could support high-speed data transmission and low power consumption together with the physical protocol (MIPI M-PHY). The unified interface controller 218 can support high-speed data transmission and enables efficient transmission of large amounts of data, enabling smooth data communication even for the application 212 that requires high performance. In addition, the unified interface controller 218 can provide a multi-device connection function that can connect and communicate with multiple devices simultaneously, enabling simultaneous communication between the multiple devices and increasing flexibility and scalability of the host 210 or the second data processing apparatus. Further, the unified interface controller 218 can support low-power operation to extend battery life and minimize power consumption, thereby improving energy efficiency in the mobile devices.

The unified protocol (MIPI UniPro) and the physical protocol (MIPI M-PHY) used in the united interface controller 218 can support serial communication protocols for high-performance inter-system communication. For example, the united interface controller 218 can support data transmission, operation control, and device management through a RapidIO Message Manager Interface (RMan IF).

The controller 260 in the memory system 250 can include a united interface controller 268, a device controller 262, a descriptor 264, and a plurality of logical units (Logical Units) 270.

According to an embodiment, the united interface controller 268 included in the controller 260 may be substantially similar to the united interface controller 218 included in the host 210. For example, the united interface controller 268 and the united interface controller 218 can operate as counter parts for each other.

The device controller 262 can manage and control overall operations performed within the memory system 250, and process and control commands (CTRL) related to data transmission. The device controller 262 can control communication between the host 210 and the memory system 250. The device controller 262 can perform operations such as reading, writing, and erasing of data in the memory system 150. Further, the device controller 262 can be configured to perform functions such as power management, error handling, and status monitoring of the memory system 250.

The descriptor 264 can include a structure (CONFIG) used for data transmission and management in the memory system 250. The descriptor 264 can contain information necessary for data transmission to define properties, size, address, etc. of data. According to an embodiment, the descriptor 264 can include information for controlling data transmission. For example, when the host 210 can set up a data transmission scheme and a data transmission speed via the descriptor 264, the device controller 262 can perform data transmission based on the data transmission scheme at the data transmission speed set up by the host 210.

The plurality of logical units 270 can include internal entities of a bus device that performs specific functions or handles specific spaces or configurations within the bus device. Each logical device can be identified with a logical device number. The plurality of logical units 270 can include components corresponding to data storage units in the memory system 250. According to an embodiment, each logical unit 270 can be configured to logically process or manipulate data, and ranges of logical addresses could be allocated to the plurality of logical units 270, so that each logical unit 270 can perform read and write operations regarding data associated with logical addresses. The memory system 250 can improve data input/output performance through the plurality of logical units 270. Each logical unit 270 independently manages and controls data, so the plurality of logical units 270 can process data in parallel. According to an embodiment, in the memory system 250 within a smartphone, each application, media file, etc. could be allocated to an individual logical unit for storing and managing data.

The memory device 280 in the memory system 250 may include a plurality of storage areas MRO 282 to MR #284, each storage area including plural memory cells. According to an embodiment, each of the plurality of storage areas 282, 284 can be allocated to each of the plurality of logical units 270.

According to an embodiment, each of the plurality of logical units 270 can control operations performed in the plurality of storage areas 282, 284 in the memory device 280 coupled through a channel (or a way), based on commands or requests. For example, a first logical unit LUO 272 can perform an operation corresponding to a command or request in the first storage area 282 and receive the execution result from the first storage area 282. A second logical unit LU #274 can perform another operation corresponding to another command or request in the second storage area 284 and receive the execution result from the second storage area 284. The first and second logical units 272, 274 can match a descriptor regarding the command delivered through the channel (or the way) with another descriptor regarding the execution result received through the channel (or the way). Accordingly, the first and second logical units 272, 274 can provide to the host 210 an execution result corresponding to a command when the command is received from the host 210.

Herein, the descriptor for commands can include data or location information corresponding to a command, such as a logical address of data associated with a write command, or a physical address of location where data associated with a read command is stored, and instruction information (e.g., channel (or way) identifier, channel number, or way number) regarding the channel (or way) through which the write or read command is transmitted. Further, the descriptor for performance results can include data or location information corresponding to the performance results, such as a logical address or a physical address for data of program operations corresponding to write commands or data of read operations corresponding to read commands, and instruction information (e.g., channel (or way) identifier, channel number, or way number) regarding the channel (or way) through which operations corresponding to the write or read commands are requested. According to an embodiment, the information included in the descriptor for the commands and the descriptor for the execution results (for example, data information, location information, or channel (or way) instruction information) can be included, added or configured in a form of context or tag.

FIG. 3 illustrates a memory system 350 according to an embodiment of the present disclosure.

Referring to FIG. 3, the memory system 350 can include a controller 360 and a memory device 380. The memory device 380 and the controller 360 in the memory system 350 can be physically separate components. The memory device 380 and the controller 360 can be coupled through at least one data path. For example, a data path can include channels and/or ways.

According to an embodiment, the memory device 380 and the controller 360 can be functionally distinct components. Further, according to an embodiment, the memory device 380 and the controller 360 can be implemented using a single semiconductor device chip or a plurality of semiconductor device chips. According to an embodiment, in a case of the memory system 350 that requires high integration, the memory device 380 and the controller 360 can be embedded in a single semiconductor device chip.

The controller 360 can control the memory device 380 to perform operations such as a read, a program, and an erase operation based on a command input from a host or an external device. The controller 360 can perform an operation independently regardless of the command input from the host. In relation to the memory device 380, the controller 360 can perform an operation for garbage collection (GC), wear leveling (WL), bad block management to identify and process bad blocks, and the like.

A plurality of memory dies MD0 to MDk 382, 384, 386, 388 included in the memory device 380 can include a plurality of data storage areas (e.g., memory blocks, memory pages, memory planes, etc.). Each storage area could be divided according to the number of bits that can be stored or expressed in a single memory cell. The memory blocks included in the memory device 380 include a single level cell (SLC) memory block, a double level cell (DLC), a triple level cell (TLC), or a quadruple level cell (QLC). In another embodiment, the memory device 380 can be implemented with a block including a plurality of pages implemented by memory cells, each capable of storing five or more bits of data.

According to an embodiment, the controller 360 may use an MLC memory block in the memory device 380 as an SLC memory block that stores one-bit data in one memory cell. A data input/output speed of an MLC memory block can be slower than that of a SLC memory block. That is, when an MLC memory block is used as an SLC memory block, a margin for a read or program operation can be reduced. The controller 360 can utilize a faster data input/output speed of the MLC memory block when using an MLC memory block as the SLC memory block. For example, the controller 360 can use an MLC memory block as a buffer or booster to temporarily store a piece of data, because the buffer or booster may require a high data input/output speed for improving performance of the memory system 350.

According to an embodiment, the controller 360 may program pieces of data in a multi-level cell (MLC) a plurality of times without performing an erase operation on the corresponding MLC memory block in the memory device 380. In general, non-volatile memory cells have a feature that does not support data overwrite. However, the controller 360 may use a feature in which a multi-level cell (MLC) may store multi-bit data, in order to program plural pieces of 1-bit data in the MLC a plurality of times. For a MLC overwrite operation, the controller 360 may store the number of program times as separate operation information when a piece of 1-bit data is programmed in a nonvolatile memory cell. According to an embodiment, an operation for uniformly levelling threshold voltages of nonvolatile memory cells can be carried out before another piece of data is overwritten in the same nonvolatile memory cells.

According to an embodiment, the memory device 380 can include at least one of Read Only Memory (ROM), Mask ROM (MROM), Programmable ROM (PROM), Erasable ROM (EPROM), Electrically Erasable ROM (EEPROM), Phase change RAM (PRAM), Magnetic RAM (MRAM), NAND or NOR flash memory, Phase Change Random Access Memory (PCRAM), Resistive Random Access Memory (RRAM or ReRAM), Ferroelectrics Random Access Memory (FRAM), or Spin Transfer Torque Magnetic Random Access Memory (STT-RAM or STT-MRAM).

The controller 360 interoperating with the memory device 380 can have a layered structure including a host controller interface (HCT) 362, a host interface layer (HIL) 364, a flash translation layer (FTL) 372, a memory controller (MCT) 366, and a memory interface layer (MIL) 368. Additionally, the controller 360 can include a memory 370 that interacts with a plurality of components included in the controller 360. Components within the controller 360 can set various buffers, caches, or queues in the memory 370. The host controller 362, the host interface layer 364, the flash translation layer 372, the memory controller 366, and the memory interface layer 368 can use the memory 370 for storing or transferring information related to input and output of data or operation information.

For example, the controller 360 may temporarily store in the memory 370 read data provided from the memory device 380 in response to a request input from the host before providing the read data to the host. Additionally, the controller 360 may temporarily store in the memory 370 write data provided from the host before programming the write data in the memory device 380. During operations such as read, program, erase, etc. of data in the memory device 380, the read data or the write data can be stored or managed in buffers, queues, etc. in the memory 370 while transmitted or generated between the controller 360 and the memory device 380 in the memory system 350. In addition to the read data or the write data, the controller 360 can store information (e.g., map data, read commands, program commands, etc.), which may be used to perform operations such as writing and reading data between the host and the memory device 380, in the buffers, the caches, and the queues set in the memory 370. The controller 360 can establish or manage at least one of a command queue, a program memory, a data memory, a write buffer/cache, a read buffer/cache, a data buffer/cache, a map buffer/cache, and the like for the memory 370.

The host controller interface 362 can control an interface between the host and the memory system 350 to enable or perform communication between the host and the memory system 350. The host controller interface 362 can be configured to manage or perform a communication procedure between the host and the memory system 350, control a physical connection therebetween, or determine how to transmit data therebetween.

The host interface layer 364 can control or manage data transmission between the host and the memory system 350. The host interface layer 364 can may be responsible for data transmission and processing. The host interface layer 364 can perform packing and unpacking, error checking and processing, security verification, etc. of data transmitted between the host and the memory system 350 in order to handle and process a preset data packet transmitted between the host and the memory system 350.

The memory interface layer 368 controls the interface between the controller 360 and the memory device 380. The memory interface layer 368 can be used for an operation to read or write data from or to the memory device 380. For example, the memory interface layer 368 can transmit write data to, or receive read data from, the memory device 380.

The memory controller 366 can include a controller that controls the memory device 380 in the memory system 350. The memory controller 366 can manage or control physical components for data storage or data retrieval. The memory controller 366 can adjust, manipulate, or change physical configurations in the memory device 380 as needed (e.g., management and control for the data storage and the data retrieval).

The flash translation layer 372 within the controller 360 can perform or process operations between the host controller interface 362, the host interface layer 364, the memory controller 366, and the memory interface layer 368. The flash translation layer 372 can control transmission and manage a mapping between a logical address used by the host, which is an external device, and a physical address used by the memory device 380. For example, the flash translation layer 372 can manage mapping data between logical addresses and physical addresses, and determine or search storage locations for data in the memory device 380. The flash translation layer 372 can perform operations to manage or improve a lifespan of the memory device 380.

According to an embodiment, the flash translation layer 372 can handle or manage events received from the host controller interface 362 or the host interface layer 364, generate or manage map data, or perform an operation for garbage collection or wear leveling. The flash translation layer 372 can be configured to track or monitor an operational status of the controller 360 and the memory device 380 or perform scheduling of commands executed within the memory device 380.

According to an embodiment, the memory interface layer 368 can further include an error correction code (ECC) unit for checking and correcting an error in data transmitted between the controller 360 and the memory device 380. The ECC unit may be implemented as a separate module, circuit, or firmware within the controller 360. According to an embodiment, the ECC unit can be installed or embedded on a memory chip or a memory die 382, 384, 386, or 388 included in the memory device 380. The ECC unit can include a program code, circuit, module, system, or device for correcting error bits of data processed or handled in the memory device 380.

Figure 4:
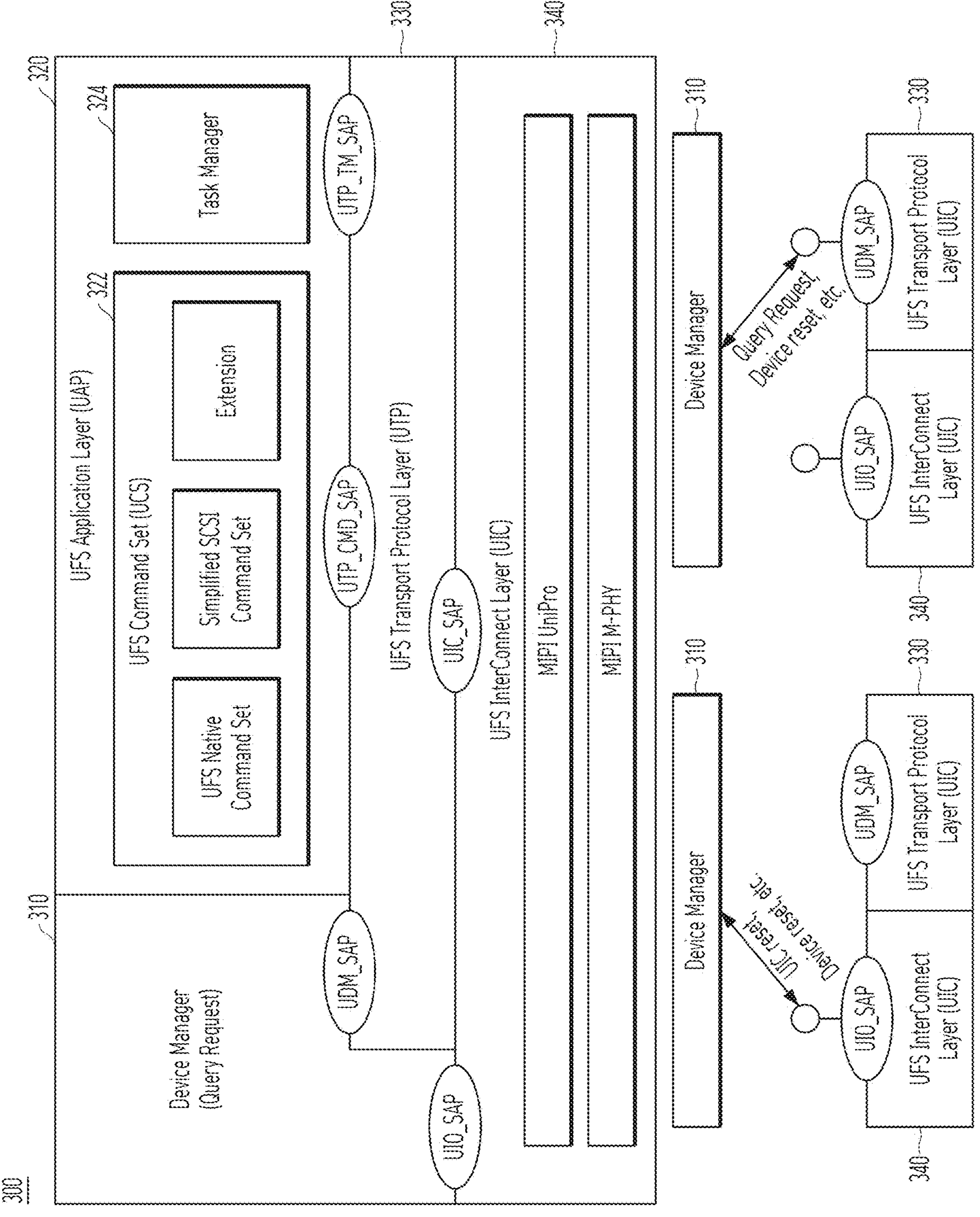
FIG. 4 illustrates a layered structure in the memory system according to an embodiment of the present disclosure.

FIG. 4 illustrates a layered structure 300 in the memory system according to an embodiment of the present disclosure. FIG. 4 shows a plurality of service layers and access points that support communication between a plurality of components in the memory system described in FIGS. 1 to 3.

Referring to FIG. 4, the service layer structure 300 within the memory system can include a plurality of service layers including a UFS Application Layer (UAP) 320, a UFS Transport Protocol Layer (UTP) 330, and a UFS Interconnect Layer (UIC) 340. The plurality of service layers is a layered communication structure. Communication between each layer can be performed through an access point.

The UFS application layer 320 can be an interface responsible for communication between the host and the memory system. The UFS application layer 320 can allow tasks such as controlling memory devices included in the memory system and reading and writing data from and in the memory devices. The UFS application layer 320 can include a UFS command set (UCS) 322, a device manager 310, and a task manager 324.

The UFS command set 322 can include a set of instructions used in communication between the host and the memory system. Here, the set of instructions can include a variety of functions needed to control the UFS device (e.g., from reading and writing data from and to the memory device to checking error conditions). The UFS command set 322 within the UFS application layer 320 can handle and process general commands such as read, write, etc. The UFS command set 322 can support multiple command sets, and may not be bound to a specific protocol. For example, the UFS command set 322 can process or handle SCSI (Small Computer System Interface)-based commands.

The task manager 324 can process commands for controlling a command queue 442 (see FIG. 5). The device manager 310 can provide device level control such as query requests or low-level link layer control.

The device manager 310 can handle or process device level operations and manage device level configurations. For example, the device level operations can include features such as device power management, settings related to data transfer, enabling background tasks, and other device-specific tasks. Additionally, the device level configurations managed by the device manager 310 can be performed by maintaining and storing a set of descriptors. The device manager 310 can process commands such as a query request that can modify or search configuration information of plural components included in the memory system.

The device manager 310 may communicate with the UFS transport protocol layer (UTP) 330 and the UFS interconnect layer (UIC) 340 through different service access points (SAPs). A UFS Device Management Service Access Point (UDM_SAP) is a service access point exposed by the UFS transport protocol layer 330 for the device manager 310 to handle device level operations and device level configuration. For example, the UDM_SAP can be used to process a query request for a descriptor. A User Input/Output Service Access Point (UIO_SAP) is a service access point exposed by the UFS interconnect layer 340 for triggering the device manager 310 to reset the UFS interconnect layer 340 or transmit a request and a response associated with a management function of the UFS interconnect layer 340.

The UFS transport protocol layer 330 can manage data transfer between the host and the memory system. For example, the UFS transport protocol layer 330 transmits data using the SCSI command set, through which operations such as reading and writing data can be performed. The UFS transport protocol layer 330 can provide services to the UFS application layer 320, the uppermost layer among the plurality of service layers. For example, the UFS transport Protocol layer 330 can use a UFS Protocol Information Unit (UPIU) that can be exchanged between transport protocol layers of the host and memory system. For example, when the host-side UFS transport protocol layer receives a request from an application layer or a device manager in the host, the host-side UFS transport protocol layer can generate a UFS Protocol Information Unit for that request and transmit the generated UFS Protocol Information Unit for the request to the peer UFS transport protocol layer on the memory system side.

According to an embodiment, the UFS transport protocol layer 330 can provide multiple access points as follows. For example, the UFS Device Manager Service Access Point (UDM_SAP) can be used to perform device level management such as descriptor access. A UTP Command Service Access Point (UTP_CMD_SAP) can be used to transmit commands. A UTP Task Management Service Access Point (UTP_TM_SAP) can be used to transport task management functions, such as the "Abort Task" function.

The UFS interconnect layer 340 can manage the physical connection between the host and the memory system. For example, the host and memory system can communicate data through protocols supported by a unified protocol (MIPI UniPro) and a physical protocol (MIPI M-PHY).

The UFS interconnect layer 340 is the lowest layer that handles a connection between the host and the memory system. The UFS interconnect layer 340 can provide two service access points to a upper layer. For example, the UFS interconnect layer 340 can provide a point between the host and the memory system. There is a UIC Service Access Point (UIC_SAP) that transfers UFS Protocol Information Units (UPIU) between UFS hosts and UFS devices. The UIC Service Access Point can correspond to a Transport Stream Application Protocol (T_SAP) of the unified protocol (UniPro) in the MIPI. The Transport Stream Application Protocol is a protocol used in MIPI's display system, which is a kind of standardized interface for transmitting video and audio data. The T_SAP can be used to transmit video streams to the display. The T_SAP can be used to allow setup, establishment, or synchronization for data flows between a display device and a transmitting device. Additionally, a UIC IO Control Service Access Point (UIO_SAP) can be used to manage the UFS interconnect layer 340. The UIC IO Control Service Access Point can correspond to a Display Stream Compression Main Extension Application Protocol (DME_SAP) of the unified protocol (UniPro). The DME_SAP is an extension protocol of Display Stream Compression (DSC), which is considered a compression technology used in a MIPI display system. The DSC can be used to compress, transmit, or decompress high-definition video data for display on a display. The DME_SAP can provide the main functions and components of the DSC. The DME_SAP can serve as a standardized interface for transmitting DSC data between the display device and the transmitting device.

FIG. 5 illustrates a service layer and a data structure for transferring debugging information according to an embodiment of the present disclosure.

Referring to FIG. 5, a UFS application layer (UAP) 420 can include a UFS command set (UCS) 422 and a task manager 424. The UFS application layer 420 can correspond to the UFS application layer 320 described in FIG. 4, and the following will focus on the differences.

The task manager 424 can parse a command input from an external device such as the host 110 shown in FIG. 1. The task manager 424 can parse a command, input from the outside, to determine or recognize which the command is related to data input/output or debugging information. Here, an operation related to the debugging information can include checking or gathering an operating status of components included in the memory system 150 shown in FIG. 1, checking or monitoring interconnection of the components, collecting statuses and results of operations performed on the components. Further, the operation related to the debugging information can include checkpoint operations and log or journal-related operations.

The UFS application layer 420 can communicate with the lower layer, e.g., the UFS transmission protocol layer (UTP) 330 of FIG. 3, through a Resource Access Point (RAP). The RAP is an access point used to access resources in the memory system 150. In addition, the UFS command set 422 in the UFS application layer 420 can include a Resource Information Protocol (RIP) set that supports a protocol for exchanging information regarding resources in the memory system 150. According to an embodiment, the UFS application layer 420 can use a UTP task management service access point (UTP_TM_SAP) instead of a resource access point (RAP). Here, resources within the memory system 150 can include various components included in the memory system 150.

The Resource Access Point (RAP) and the Resource Information Protocol (RIP) set can be established or set separately for delivery of the debugging information. The UFS Protocol Information Unit (UPIU) that can be exchanged between the transport protocol layers of the host 110 and the memory system 150 can be additionally set or configured. When a command set in the Resource Information Protocol (RIP) set is transmitted from the host 110, the task manager 424 can check the command and transmit the command to the UFS transport protocol layer (UTP) 330 through the Resource Access Point (RAP) or the UTP task management service access point (UTP_TM_SAP). That is, an operation or processing related to the UFS Protocol Information Unit (UPIU) for exchanging the debugging information in the UFS application layer 420 can be assigned to the task manager, like the Task Manager Function (TMF).

Referring to FIG. 5, an operation or processing of the debugging information in the UFS application layer 420 can be performed through an access point separate or distinct from another access point used for processing the data input/output. The operation or processing of the debugging information can be performed or advanced through the Resource Access Point (RAP) or UTP Task Management Service Access Point (UTP_TM_SAP), while the operation or processing of the data input and output is performed or advanced through the UTP Command Service Access Point (UTP_CMD_SAP). In addition to the access points, the host interface layer (HIL) 464 can include a command queue 442 that stores instructions related to processing the data input and output and a resource information queue (RAP QUEUE) 444 that stores instructions related to processing the debugging information. Through this configuration, a task of processing the debugging information in the memory system 150 might not interfere with another task of processing the data input and output.

In the case of a conventional memory system, the memory system or a data processing apparatus including the memory system could be coupled to separate debugging equipment, or the memory system or the data processing apparatus may include a debugging device, to process or handle the debugging information. In this case, it may be difficult to perform a debugging operation corresponding to an environment in which the memory system or data processing apparatus operates and a current operating state of the memory system or data processing apparatus. Moreover, installing additional devices on the memory system and host to extract the debugging information in a real time or in a timely manner might increase fabrication costs and hinder miniaturization of the memory system or the host. On the other hand, according to an embodiment of the present disclosure, separate and distinct commands for transmitting and exchanging the debugging information and the data input and output can be set, but the separate and distinct commands could be communicated between the memory system 150 and the host 110 in substantially the same way. This scheme does not increase fabrication costs and might not interfere with the miniaturization. Further, the memory system 150 can distinguish a first command for the data input/output and a second command for transmitting and exchanging the debugging information from each other. The memory system 150 can process the first and second commands independently and separately, allowing the debugging information to be extracted in a real time or in a timely manner without interfering with data input/output performance of the memory system 150.

FIG. 6 illustrates an operation of a conventional memory system, and FIG. 7 illustrates an operation of the memory system device according to an embodiment of the present disclosure. By comparing FIGS. 6 and 7, the effect of an embodiment of the present disclosure will be described. Referring to FIGS. 6 and 7, commands for debugging operations can be processed differently in a conventional memory system and a memory system according to an embodiment of the present disclosure.

Referring to FIG. 6, the conventional memory system can have one command queue 442. On the other hand, referring to FIG. 7, the memory system according to an embodiment of the present disclosure can include a command queue 442 and a resource information queue (RAP QUEUE) 444. Here, for convenience of description, a depth of the command queue 442 included in the conventional memory system and the memory system according to an embodiment of the present disclosure is set as the same as 4 (that is, the command queue can store up to 4 commands). Further, internal processing performance of the conventional memory system and the memory system according to an embodiment of the present disclosure for read operations, write operations, debugging operations, etc. are also set substantially the same.

In FIGS. 6 and 7, a set of plural commands can be equally transmitted from the host to the conventional memory system and the memory system according to an embodiment of the present disclosure. The set of plural commands can be composed of an order of commends including a first command ($C^1$, CMD[W]) for a write operation, a second instruction ($C^2$, CMD[R]) for a read operation, a third command ($C^3$, CMD[$W^{C1\ Checkpoint}$]) for a checkpoint operation regarding the write operation responsive to the first command ($C^1$, CMD[W]), a fourth command ($C^4$, CMD[R]) for another read operation, a fifth command ($C^5$, CMD[$R^{C2\ Checkpoint}$]) for a checkpoint operation regarding the read operation responsive to the second command ($C^2$, CMD[R]), and the sixth command ($C^6$, CMD[R]) for another read operation.

Because the conventional memory system uses a single command queue 442, the first command ($C^1$, CMD[W]) to the fourth command ($C^4$, CMD[R]) can be sequentially added into the command queue 422. Afterwards, because the depth of the command queue 422 is 4, the conventional memory system can request a delay for the fifth command ($C^5$, CMD[$R^{C2\ Checkpoint}$]) for the checkpoint operation (Host Req. Pending). Because the read operation is performed faster than the write operation, a second response ($R^2$) of the read operation responsive to the second command ($C^2$, CMD[R]) can be made before a first response ($R^1$) of the write operation responsive to the first command ($C^1$, CMD[W]) is made. Then, an empty area in the command queue 442 occurs due to the second response ($R^2$) because the second command ($C^2$, CMD[R]) could be released. The conventional memory system can receive the fifth command ($C^5$, CMD[$R^{C2\ Checkpoint}$]) for the checkpoint operation, which is input from the host. Due to the depth of the command queue 442 (DepthMax[4]), the host has delayed the request to be delivered (pending), but can transmit the fifth command ($C^5$, CMD[$R^{C2\ Checkpoint}$]) to the conventional memory system after the empty area has occurred in the command queue 442. Due to the command queue 422 in the conventional memory system, a time at which the fifth command ($C^5$, CMD[$R^{C2\ Checkpoint}$]) would be delivered is later than a time desired by the host, which causes the fifth command ($C^5$, CMD[$R^{C2\ Checkpoint}$]) to be delivered. The checkpoint operation corresponding to, can miss a golden time ( $D^{5}_{R2}$FAIL ). In addition, timings of transmitting the sixth command ($C^6$, CMD[R]), a seventh command ($C^7$, CMD[R]), an eighth command ($C^8$, CMD[R]), and the like could be continuously delayed (pending), after the 5th command ($C^5$, CMD[$R^{C2\ Checkpoint}$]) is delivered from the host to the conventional memory system.

Referring to FIG. 7, the memory system according to an embodiment of the present disclosure can include a command queue 442 and a resource information queue 444. The set of plural commands can include user requests from a host, which are substantially the same as that described in FIG. 6. The host can transmit the same set of plural commands to the memory system. In an embodiment of the present disclosure, requests for checkpoint operations related to the debugging information can be transmitted or processed through the resource information queue 444 rather than the command queue 442. Thus, operations responsive to the set of plural commands input from the host could be processed in parallel through the command queue 442 for the data input/output and the resource information queue 444 for the checkpoint operations.

Among eight commands among the set of plural commands, a first command ($C^1$, CMD[W]), a second command ($C^2$, CMD[R]), a third command ($C^3$, CMD[R]), and a fourth command ($C^4$, CMD[R])), a fifth command ($C^5$, CMD[R]), and a sixth command ($C^6$, CMD[R]) may be sequentially included in the command queue 422. On the other hand, the memory system can include a first resource information command (RIP[$W^{C1\ Checkpoint}$]) and a second resource information command (RIP[$R^{C2\ Checkpoint}$]) among the eight commands into the resource information queue 444. Herein, the first resource information command (RIP [$W^{C1\ Checkpoint}$]) and the second resource information command (RIP[$R^{C2\ Checkpoint}$]) could correspond to the third command ($C^3$, CMD[$W^{C1\ Checkpoint}$]) and the fifth command ($C^5$, CMD[$R^{C2\ Checkpoint}$]) described in FIG. 6, respectively. That is, the operations that the memory system would perform responsive to the first resource information command (RIP[$W^{C1\ Checkpoint}$]) and the third command ($C^3$, CMD[$W^{C1\ Checkpoint}$]) are substantially the same. However, the first resource information command (RIP[$W^{C1\ Checkpoint}$]) and the third command ($C^3$, CMD [$W^{C1\ Checkpoint}$]) are expressed in different ways because the first resource information command (RIP[$W^{C1\ Checkpoint}$]) and the third command ($C^3$, CMD[$W^{C1\ Checkpoint}$]) could be delivered or transmitted from the host to the memory system based on different protocols.

The memory system can receive and process the first resource information command (RIP[$W^{C1\ Checkpoint}$]) and the second resource information command (RIP[$R^{C2\ Checkpoint}$]) through the resource information queue 444, which are distinct and separate from the data input/output commands such as the first command ($C^1$, CMD[W]) to the sixth command ($C^6$, CMD[R]). Accordingly, there may be no delay in times for transmitting the first resource information command (RIP[$W^{C1\ Checkpoint}$]) and the second resource information command (RIP[$R^{C2\ Checkpoint}$]) from the host and the memory system. Unlike the conventional memory system described in FIG. 6, in the memory system according to an embodiment of the present disclosure, there is no delay for multiple resource information commands ( $$D_{Nn}^{N}$$

) including the first resource information command (RIP [$W^{C1\ Checkpoint}$]) and the second resource information command (RIP[$R^{C2\ Checkpoint}$]), so that checkpoint operations responsive to the multiple resource information commands $$D_{Nn}^{N}$$

can be performed while observing the golden time.

Additionally, the memory system according to an embodiment of the present disclosure does not need to send a delay request to the host while six commands are sequentially delivered from the host. The fifth command ($C^5$, CMD[R]) transmitted for the seventh time from the host should be stored in the command queue 442 because it is related to the data input/output. However, the fifth command ($C^5$, CMD [R]) could be input without a delay from the host to the memory system, because a second response ($R^2$) for a read operation responsive to the second command ($C^2$, CMD[R]) could be output to the host before the fifth command ($C^5$, CMD[R]) is input. Accordingly, the memory system according to an embodiment of the present disclosure can also receive the sixth command ($C^6$, CMD[R]) input from the host after the fifth command ($C^5$, CMD[R]) without a delay, because a third response (R3) for another read operation responsive to the third command ($C^3$, CMD[R]) could be output ahead of time. That is, from the host's perspective, the memory system according to an embodiment of the present disclosure can significantly reduce a possibility of requesting a delay even when multiple commands are transmitted, and the host could be satisfied with the input/output performance of the memory system.

Additionally, as in the conventional memory system, if the memory system requests a delay after the host transmits the third command ($C^3$, CMD[$W^{C1\ Checkpoint}$]), there may be doubts about whether operation results responsive to the third command ($C^3$, CMD[$W^{C1\ Checkpoint}$]) were processed in a timely manner, from the host's perspective. This can reduce an operational reliability of the memory system. However, because the memory system according to an embodiment of the present disclosure does not request a delay to the host, the first resource information command (RIP[$W^{C1\ Checkpoint}$]) and the second resource information command (RIP[$R^{C2\ Checkpoint}$]) corresponding to the third command ($C^3$, CMD[$W^{C1\ Checkpoint}$]) and the fifth command ($C^5$, CMD[$W^{C2\ Checkpoint}$]) for the checkpoint operations, respectively, could be processed in a timely manner without delay. Accordingly, the operational reliability of the memory system could be improved.

As above described, the memory device or the memory system including the memory device according to an embodiment of the present disclosure can perform an operation corresponding to a debugging data or information request input from external devices through a processing process that is distinct from that used for a data input/output request, thereby providing a timely response to the debugging data or information request without deteriorating data input/output performance of the memory system.

Further, the memory system according to an embodiment of the present disclosure can handle or carry out the debugging data or information request through changes in the data structure and protocol of the memory system that processes commands or requests transmitted from an external device, so that changes in components processing the data input/output request for data input/output could be reduced, improving compatibility and efficiency of the components in the memory system.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, logics, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, logics, interfaces, decoders, drivers, generators and other signal generating and signal processing features may be, for example, any of a variety of united circuits including but not limited to an application-specific united circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, generators, logics, interfaces, decoders, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods or operations of the computer, processor, microprocessor, controller, or other signal processing device, are described in detail, the code or instructions for implementing the operations of the method embodiments may transform the computer, processor, controller, or other signal processing device into a special-purpose processor for performing the methods described herein.

While the present disclosure has been illustrated and described with respect to the specific embodiments, it will be apparent to those skilled in the art in light of the present disclosure that various changes and modifications may be made without departing from the spirit and scope of the present disclosure as defined in the following claims. Furthermore, the embodiments may be combined to form additional embodiments.

What is claimed is:

1. A memory system comprising:

at least one memory device; and a controller coupled to the at least one memory device, the controller having a layered structure including plural service layers and including at least one component configured to provide communication between the plural service layers, wherein the plural service layers include an uppermost layer and a next layer adjacent to the uppermost layer, and the uppermost layer is configured to parse whether a command input from an external device is related to data input and output or debugging information, and send, based on a parsing result, the command to the next layer via one of multiple access points corresponding to multiple queues included in a host interface layer, wherein the access points are different from each other, and the multiple queues are different from each other.

2. The memory system according to claim 1, wherein the uppermost layer comprises an application layer, and the next layer comprises a transport protocol layer.

3. The memory system according to claim 2, wherein the transport protocol layer is configured to exchange a query request and a query response to the query request with the application layer through one of a first access point used for performing device level management including descriptor access, a second access point used for transmitting a command related to the data input and output, and a third access point used for transmitting a command related to the debugging information, wherein the second access point and the third access point are included in the multiple access points.

4. The memory system according to claim 3, wherein the application layer transmits an abort task function through the third access point.

5. The memory system according to claim 1, wherein the multiple queues comprise a first queue storing a command related to the data input and output, and a second queue storing a command related to the debugging information, and wherein the uppermost layer comprises a task manager configured to add the command input from the external device into one of the first queue and the second queue.

6. The memory system according to claim 1, wherein the controller that is configured to control a device level operation comprises a device manager configured to manage a device level configuration, wherein the device level operation comprises a device power management, a data transfer related setting, and a background task activation, and wherein the device level configuration comprises an operation for processing a query request which is used for modifying or retrieving configuration information through a set of descriptors.

7. The memory system according to claim 6, wherein the device manager is configured to:

exchange a query request and a query response to the query request with a transport protocol layer through a fourth access point for processing a device level operation and configuration including processing a query request regarding descriptors; and exchange a query request and a query response to the query request through a fifth access point for triggering a reset of an interconnect layer and performing a management function for the interconnect layer.

8. The memory system according to claim 1, wherein the at least one memory device comprises at least one data storage area including non-volatile memory cells, and wherein the controller and the at least one memory device are coupled through at least one channel.

9. The memory system according to claim 8, wherein the at least one component comprises:

a host controller interface configured to control a physical connection with the external device and determine a data transmission scheme for enabling data communication with the external device;

the host interface layer configured to manage a data packet input from or output from the external device;

a flash controller configured to control a physical connection with the at least one memory device and determine a data transmission scheme for enabling communication with the at least one memory device;

a flash interface layer configured to manage a data packet output from or stored in the at least one memory device; and a flash translation layer configured to control processing and transfer of tasks among the host controller interface, the host interface layer, the memory controller, and the flash interface layer, and to manage mapping between a first address used by the external device and a second address used by the at least one memory device.

10. The memory system according to claim 1, wherein the command comprises information for security authentication when the command relates to the debugging information, and wherein the controller is configured to determine a validity of the information for the security authentication included in the command.

11. A memory controller comprising:

a host interface layer operably engaged with an external device; and a memory control layer operably engaged with a memory device, wherein the host interface layer is configured to:

parse whether a command input from the external device is related to data input and output or debugging information;

store the command in one of data structures based on a parsing result; and handle the command through one of multiple access points corresponding to the data structures included in the host interface layer to transfer the command to the memory control layer.

12. The memory controller according to claim 11, wherein the data structures comprise:

a first queue storing a command related to the data input/output; and a second queue storing a command related to the debugging information.

13. The memory controller according to claim 11, wherein the host interface layer is configured to perform operations provided by plural service layers comprising an uppermost layer and a lower layer lower than the uppermost layer, the uppermost layer includes an application layer, and the lower layer includes a transport protocol layer.

14. The memory controller according to claim 13, wherein the transport protocol layer is configured to exchange a query request and a query response to the query request with the application layer through one of the first access point for performing device level management including descriptor access, the second access point for transmitting a command related to the data input and output, and the third access point for transmitting a command related to the debugging information, wherein the second access point and the third access point are included in the multiple access points.

15. The memory controller according to claim 14, wherein the application layer transmits an abort task function through the third access point.

16. The memory controller according to claim 13, wherein the uppermost layer includes a task manager configured to add a command input from the external device into one of a first queue and a second queue.

17. The memory controller according to claim 11, further comprising a device manager configured to manage a device level configuration, wherein the device level operation comprises a device power management, a data transfer related setting, and a background task activation, and wherein the device level configuration comprises an operation for processing a query request which is used for modifying or retrieving configuration information through a set of descriptors.

18. The memory controller according to claim 17, wherein the device manager is configured to:

exchange a query request and a query response to the query requests with a transport protocol layer through a fourth access point used for processing a device level operation and configuration which includes processing a query request regarding descriptors; and exchange a query request and a query response to the query request through a fifth access point used for triggering a reset of an interconnect layer and performing a management function for the interconnect layer.

19. The memory controller according to claim 17, wherein the memory controller is coupled through at least one channel to at least one memory device comprising at least one data storage area including non-volatile memory cells.

20. The memory controller according to claim 19, further comprising:

a host controller interface configured to control a physical connection with the external device and determine a data transmission scheme for enabling data communication with the external device;

the host interface layer configured to manage a data packet input from or output from the external device;

a flash controller configured to control a physical connection with the at least one memory device and determine a data transmission scheme for enabling communication with the at least one memory device;

a flash interface layer configured to manage a data packet output from or stored in the at least one memory device; and a flash translation layer configured to control processing and transfer of tasks among the host controller interface, the host interface layer, the flash controller, and the flash interface layer, and to manage mapping between a first address used by the external device and a second address used by the at least one memory device.

* * * * *